(12) United States Patent
Geese et al.

(10) Patent No.: US 9,103,476 B2
(45) Date of Patent: Aug. 11, 2015

(54) GASKETED PIPE CLAMP

(75) Inventors: Brian T. Geese, Lake Orion, MI (US);
Brian T. Ignaczak, Rochester, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 0 days.

(21) Appl. No.: 13/010,263

(22) Filed: Jan. 20, 2011

(65) Prior Publication Data
US 2012/0018999 A1    Jan. 26, 2012

Related U.S. Application Data

(60) Provisional application No. 61/296,939, filed on Jan. 21, 2010.

(51) Int. Cl.
*F16L 21/06* (2006.01)
*F01N 13/18* (2010.01)

(52) U.S. Cl.
CPC ........... *F16L 21/065* (2013.01); *F01N 13/1805* (2013.01); *F01N 13/1855* (2013.01)

(58) Field of Classification Search
CPC ........ F16L 21/005; F16L 21/02; F16L 21/022
USPC .................. 285/367, 368, 365, 366, 373, 420
See application file for complete search history.

(56) References Cited

U.S. PATENT DOCUMENTS

| | | | | |
|---|---|---|---|---|
| 356,083 A * | 1/1887 | Schrader | ...................... | 24/20 EE |
| 896,333 A * | 8/1908 | Smith | ............................ | 285/113 |
| 982,028 A * | 1/1911 | Austin | ........................... | 285/197 |
| 1,903,029 A * | 3/1933 | Damsel | .......................... | 285/373 |
| 1,942,600 A * | 1/1934 | Hornung | ............................ | 24/19 |
| 2,650,115 A * | 8/1953 | Taylor | ............................. | 285/105 |
| 3,086,270 A * | 4/1963 | Zartler | ............................ | 24/278 |
| 3,355,193 A * | 11/1967 | Craig et al. | .................... | 285/197 |

(Continued)

FOREIGN PATENT DOCUMENTS

| | | |
|---|---|---|
| JP | 2005508483 | 3/2005 |
| JP | 2005509103 | 4/2005 |

(Continued)

OTHER PUBLICATIONS

International Search Report for PCT/US2011/021857 Sep. 2, 2011, 3 pages.

(Continued)

*Primary Examiner* — James Hewitt
*Assistant Examiner* — James Linford
(74) *Attorney, Agent, or Firm* — Reising Ethington P.C.

(57) ABSTRACT

A pipe clamp that includes a band having an inner surface defining a first channel segment located inwardly of first and second axial ends of the band, a tightening mechanism for drawing first and second circumferential ends of the band toward each other to tighten the band, and a bridge abutting the inner surface and circumferentially spanning a break in the first channel segment that is located at the tightening mechanism, The bridge has a second channel segment aligned with the first channel segment such that the first and second channel segments together define a substantially continuous circular channel located at an interior portion of the clamp. The pipe clamp further includes a gasket seated at least partially within the channel. The bridge can be attached to a reaction block used in the tightening mechanism to maintain proper position during tightening of the band.

5 Claims, 6 Drawing Sheets

(56) References Cited

U.S. PATENT DOCUMENTS

| | | | |
|---|---|---|---|
| 3,471,176 A * | 10/1969 | Gilchrist | 285/111 |
| 3,472,537 A * | 10/1969 | Paterson et al. | 285/197 |
| 3,700,008 A * | 10/1972 | Hackman | 138/99 |
| 3,905,623 A * | 9/1975 | Cassel | 285/382 |
| 4,056,273 A * | 11/1977 | Cassel | 285/337 |
| 4,155,574 A * | 5/1979 | Hulsey | 285/236 |
| 4,315,348 A | 2/1982 | Oetiker | |
| 4,364,588 A * | 12/1982 | Thompson | 285/419 |
| 4,664,428 A | 5/1987 | Bridges | |
| 5,315,742 A * | 5/1994 | Fay | 24/274 R |
| 5,339,496 A * | 8/1994 | Oetiker | 24/20 CW |
| 5,410,781 A * | 5/1995 | Anjos et al. | 24/274 R |
| 5,669,113 A * | 9/1997 | Fay | 24/20 CW |
| 5,765,876 A * | 6/1998 | Bridges | 285/15 |
| 5,769,467 A * | 6/1998 | Bridges | 285/370 |
| 6,062,610 A * | 5/2000 | Andersson et al. | 285/367 |
| 6,269,524 B1 * | 8/2001 | Cassel | 24/279 |
| 6,305,054 B1 * | 10/2001 | Imes et al. | 24/276 |
| 6,519,815 B2 * | 2/2003 | Cassel et al. | 24/279 |
| 6,634,607 B2 * | 10/2003 | Vogel et al. | 248/74.3 |
| 6,773,037 B2 * | 8/2004 | Spurgat | 285/23 |
| 6,877,191 B2 * | 4/2005 | Logan et al. | 24/279 |
| 7,052,052 B2 * | 5/2006 | Protas et al. | 285/420 |
| 2002/0014772 A1 * | 2/2002 | Amedure et al. | 285/373 |
| 2003/0015872 A1 * | 1/2003 | Potts et al. | 285/420 |
| 2003/0084551 A1 * | 5/2003 | Tran | 24/279 |
| 2004/0003792 A1 * | 1/2004 | Kono | 123/184.21 |
| 2004/0178632 A1 | 9/2004 | Protas et al. | |
| 2005/0039306 A1 * | 2/2005 | Logan et al. | 24/19 |
| 2005/0066480 A1 | 3/2005 | Richter et al. | |
| 2005/0184522 A1 * | 8/2005 | Potts et al. | 285/420 |
| 2005/0189768 A1 * | 9/2005 | Avram et al. | 285/419 |
| 2006/0175837 A1 * | 8/2006 | Ignaczak et al. | 285/420 |
| 2007/0063514 A1 * | 3/2007 | Noda | 285/366 |
| 2009/0079189 A1 * | 3/2009 | Cassel et al. | 285/420 |
| 2009/0189392 A1 * | 7/2009 | Ignaczak | 285/420 |
| 2010/0257702 A1 * | 10/2010 | Fritskey et al. | 24/20 R |

FOREIGN PATENT DOCUMENTS

| | | |
|---|---|---|
| KR | 1020040080334 | 9/2004 |
| KR | 1020070003717 | 1/2007 |

OTHER PUBLICATIONS

European Search Report for corresponding application No. EP 11 73 5170, Apr. 1, 2014, 7 pages.

* cited by examiner

GASKETED PIPE CLAMP

CROSS-REFERENCE TO RELATED APPLICATION

This application claims the priority of U.S. Provisional Application No. 61/296,939, filed Jan. 21, 2010, the entire contents of which are hereby incorporated by reference.

TECHNICAL FIELD

This invention relates to pipe clamps, and to pipe clamps having gaskets.

BACKGROUND OF THE INVENTION

Pipe clamps are commonly used to join tubular components together; for example, pipes or tubular housings. These clamps can be used in a variety of applications with some clamps specifically designed for specific components or for use in specific applications, and others of a design intended to make them more generally or universally applicable. One such application of pipe clamps is in connecting pipes or other components in automotive exhaust systems. Often, these exhaust system applications require or at least desirably provide a joint between pipe ends that seals against exhaust gas leakage and that has good resistance against axial separation. One type of pipe clamp is a band clamp which is used with telescopically overlapping pipe ends, and another type is a pipe coupler which is used with end-to-end abutting pipe ends. Both types usually include a metal band to be placed and tightened over the pipe ends, and both types can include a sealing sleeve and/or a gasket to be sandwiched between the band and the pipe ends.

SUMMARY OF THE INVENTION

In accordance with an embodiment of the invention, there is provided a pipe clamp that includes a band having an inner surface defining a first channel segment located inwardly of first and second axial ends of the band, a tightening mechanism for drawing first and second circumferential ends of the band toward each other to tighten the band, and a bridge abutting the inner surface and circumferentially spanning a break in the first channel segment that is located at the tightening mechanism, The bridge has a second channel segment aligned with the first channel segment such that the first and second channel segments together define a substantially continuous circular channel located at an interior portion of the clamp. The pipe clamp further includes a gasket seated at least partially within the channel.

In accordance with another embodiment of the invention, there is provided a pipe clamp that includes a band having an inner surface defining a first channel segment located inwardly of first and second axial ends of the band, a tightening mechanism for drawing first and second circumferential ends of the band toward each other to tighten the band, a bridge abutting the inner surface and circumferentially spanning a break in the first channel segment that is located at the tightening mechanism, and a gasket seated at least partially within the first channel segment. The tightening mechanism includes a reaction block, with the bridge being attached to a radially-facing inward surface of the reaction block. Upon tightening of the tightening mechanism the bridge keeps with the reaction block when the first and second circumferential ends of said band come closer together and closer to the reaction block.

In other embodiments of the invention there is provided a pipe clamp having a band, tightening mechanism, bridge, and gasket located at least partially within a channel that extends circumferentially around the band and through the bridge. In some of these embodiments the bridge can have circumferential ends that are beveled at a selected angle (for example, within the range of 1° to 10°) to thereby provide a substantially uninterrupted inner surface of the channel against which said gasket is seated. In either these or other embodiments, the tightening mechanism can include a reaction block that engages one or more radially protruding embossments on the bridge to thereby exert a radially-inward force on the bridge during tightening of the band. Also in these or other embodiments, the bridge and band can each have cooperating pilot features that act to guide the positioning of the bridge under the band during use and tightening of the clamp. The pilot features can be implemented in any suitable manner, but in some embodiments include a cutout located in the band and a finger extending radially from the bridge that fits within the cutout. In some of the embodiments which use the cutout and finger pilot features, a separate cutout and finger can be located at each axial end of the band and bridge such that the bridge is inhibited from moving axially relative the band in either axial direction by engagement of the fingers with their respective cutouts.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
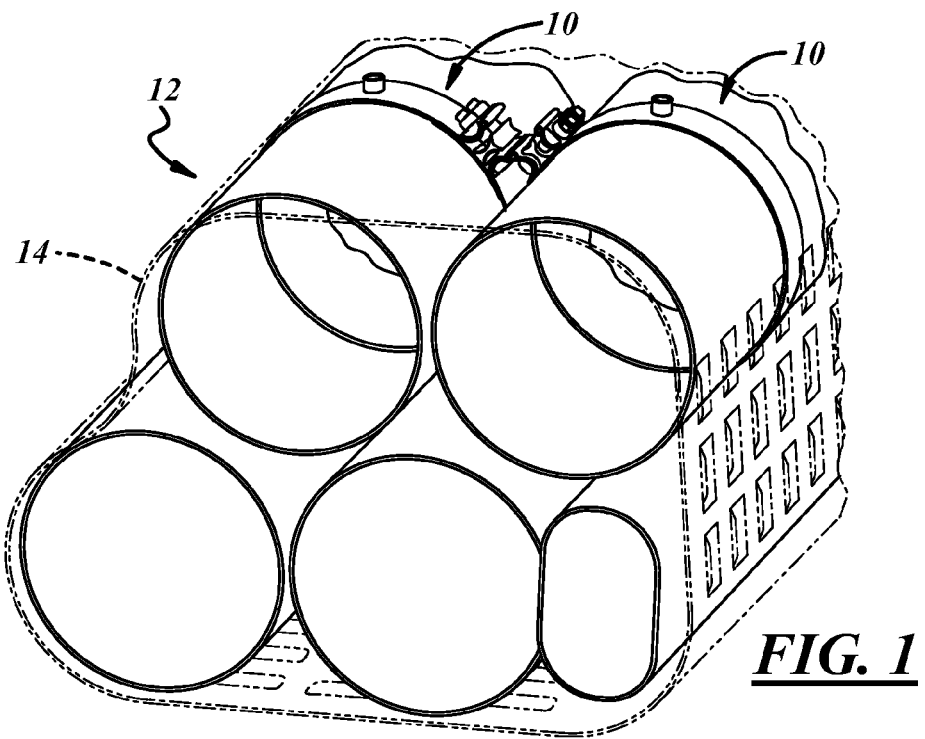
FIG. 1 is a perspective view of a multi-pipe assembly.

Referring to the drawings, an exemplary embodiment of a pipe clamp 10 is used to join pipe ends together in an automotive exhaust system to provide a fluid-tight seal with good resistance against axial separation. As shown and described, the pipe clamp 10 is suited for use as a pipe coupler to secure abutting pipe ends, but could be adapted for telescopically overlapping pipe ends. In general, the pipe clamp 10 has a mostly circular and cylindrical shape which defines an axial direction extending along or generally parallel to a center axis of the shape, a radial direction extending along the radius of the shape, and a circumferential direction extending along the circumference of the shape.

Referring to FIG. 1, multiple clamps 10 can be used in a multi-pipe assembly 12 commonly equipped in large trucks such as semi-trailer trucks, and commonly associated with diesel particulate filters (DPFs). In these high temperature applications, a heat shield 14 (phantom) is often placed around the multi-pipe assembly 12 to insulate it from its surroundings, and the multiple pipe clamps 10 are oriented so that their structures do not interfere with the heat shield. Apart from the DPF application shown in FIG. 1, the pipe clamp 10 can be used with other exhaust system components, as well as with a single exhaust pipe assembly, and smaller automobiles without heat shields. Thus, the pipe clamps disclosed and claimed herein can be used not only for securing regular straight pipe sections, but also for such things as DPF canisters, catalytic converters, and other tubular components in automotive systems, as well as in non-automotive applications.

Figure 2:
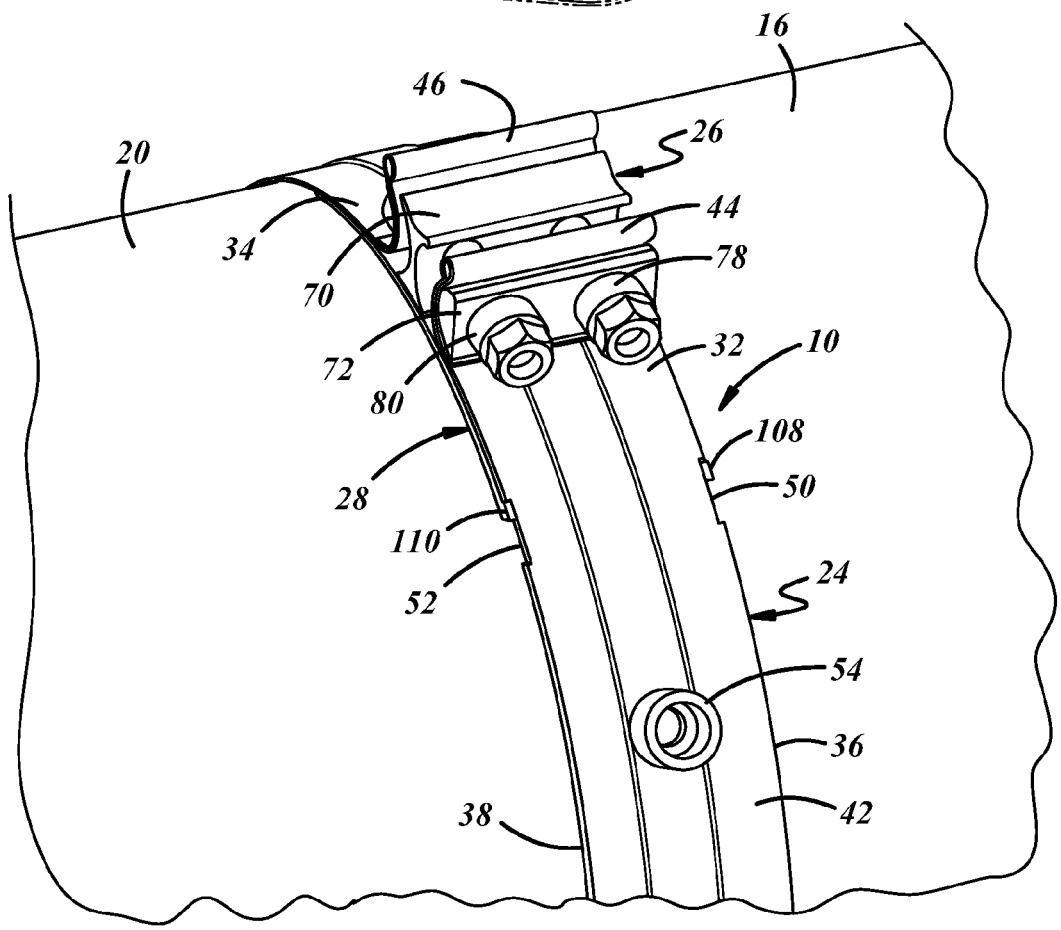
FIG. 2 is an enlarged view of an exemplary embodiment of a pipe clamp.
Figure 3:
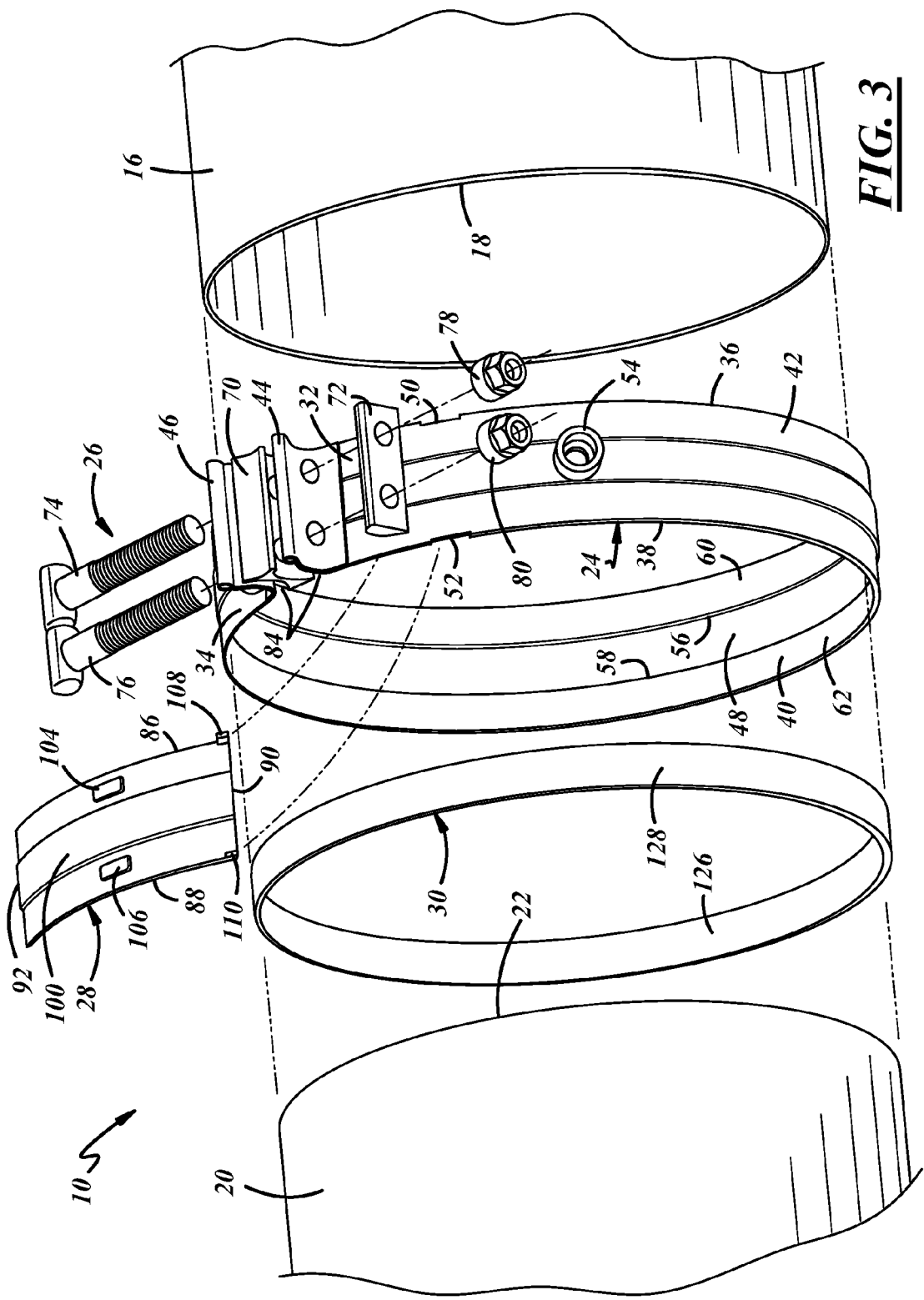
FIG. 3 is an exploded view of the pipe clamp of FIG. 2.

Referring to FIGS. 2 and 3, the pipe clamp 10 joins an abutting or closely abutting first pipe end 18 of a first pipe 16 with a second pipe end 22 of a second pipe 20. In the illustrated embodiment, the pipe clamp 10 includes a band 24, a tightening mechanism 26, a bridge 28, and a gasket 30.

The band 24 circumferentially surrounds the first and second pipe ends 18, 22. The band 24 can be made from a sheet of steel, such as grade 409 stainless steel, or another suitable material, that is metal-worked into an open loop. In different examples, the band 24 has an axial width ranging between about 55-68 mm and has a radial thickness of about 1.22 mm; of course other dimensions are possible and will depend on the application. Still referring to FIGS. 2 and 3, the band 24 extends circumferentially from a first circumferential end 32 to a second circumferential end 34, and extends axially from a first axial end 36 to a second axial end 38. On a radially inwardly facing side the band 24 has an inner surface 40, and on a radially outwardly facing side the band has an outer surface 42.

Figure 4:
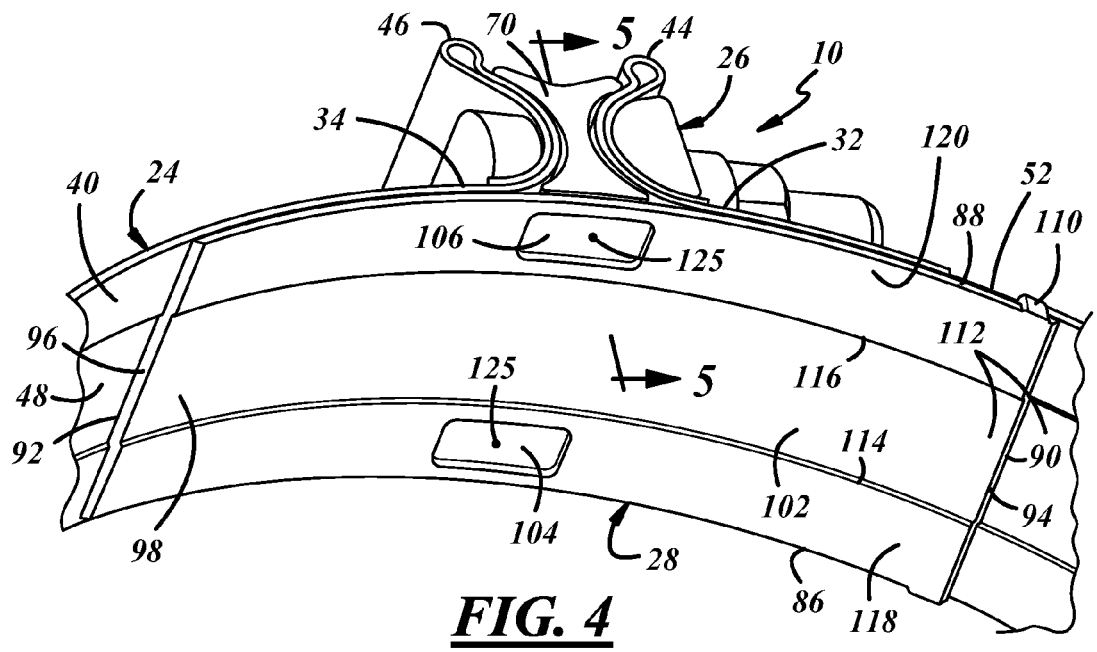
FIG. 4 is an enlarged view of an exemplary embodiment of a bridge used with the pipe clamp of FIG. 2.

In the embodiment shown, the band 24 has a first and second flange 44, 46, a first channel segment 48, a first and second pilot feature 50, 52, and a probe boss 54. As best shown in FIG. 4, the first and second flanges 44, 46 respectively comprise unitary portions of the first and second circumferential ends 32, 34, and are formed by portions of the band 24 folded away from each other and back on themselves to provide a pair of radially-protruding loops, each loop having an inner and an outer leg. The first channel segment 48 receives the gasket 30 and is located about axially midway in the band 24 inwardly of the first and second axial ends 36, 38, and extends circumferentially at least part way between the first and second circumferential ends 32, 34. The first channel segment 48 is located in the inner surface 40 and produces a radially protruding rib in the outer surface 42. In one example, the radial depth of the first channel segment 48 as measured from the immediately surrounding and unchanneled inner surface 40 is about 0.4 mm; the exact radial depth of the first channel segment can vary for different applications and can depend on, among other factors, the radial thickness of the gasket 30. The first channel segment 48 is bounded by slanted first and second transitional sections 56, 58, that lead to axially extending first and second side walls 60, 62. In some embodiments, the first channel segment 48 extends circumferentially into the first and second flanges 44, 46 such that each flange has a radially protruding rib or a relieved or notched section located at a lower portion thereof and matching the radially protruding rib of the outer surface 42 so that the flanges can accommodate the first channel segment.

Figure 6:
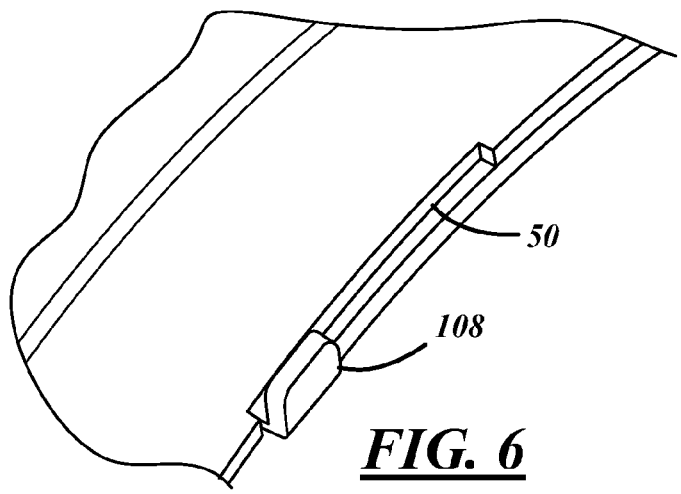
FIG. 6 is an enlarged view of exemplary embodiments of pilot features used with the pipe clamp of FIG. 2.

The first and second pilot features 50, 52 interact with complementary pilot features of the bridge 28 to guide positioning of the bridge with respect to the band 24. When initially assembled, the pilot features help axially and circumferentially locate the bridge 28 with the band 24. Also, when tightened down, the pilot features help maintain the axial and circumferential positions of the bridge 28 with the band 24. Referring to FIGS. 2 and 6, in the illustrated embodiment, the first and second pilot features 50, 52 are first and second rectangular cutouts respectively located in the first and second axial ends 36, 38. In other embodiments the first and second pilot features 50, 52 can have different designs and locations. For example, the pilot features could be openings located in the band 24 and positioned axially inward of the axial ends 36, 38, the pilot features could be radially inwardly projections, a single pilot feature or more than two pilot features could be provided, or a combination thereof. Furthermore, the first and second pilot features need not be provided in the band 24.

Figure 5:
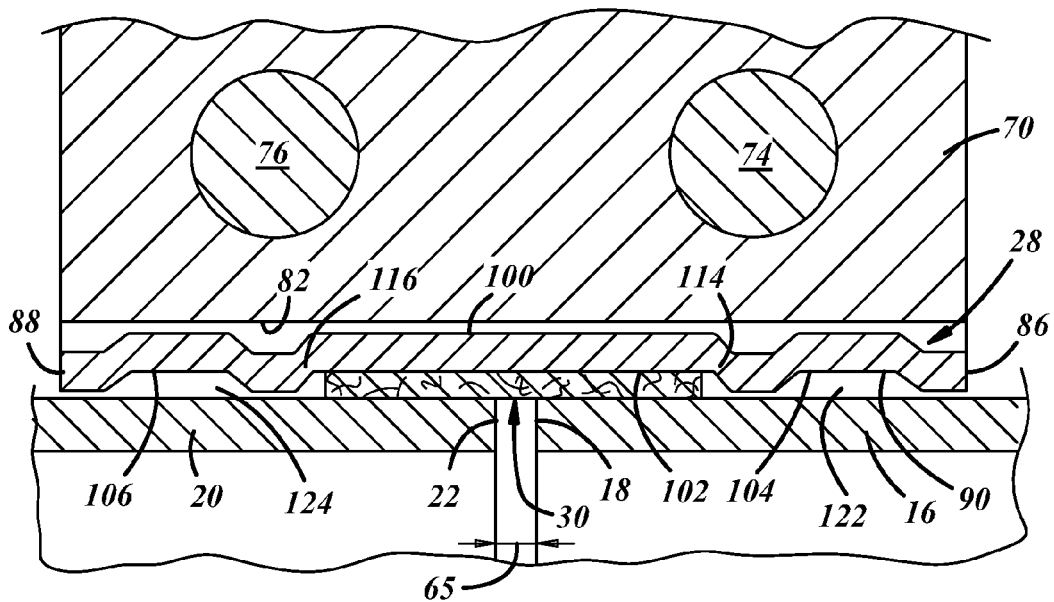
FIG. 5 is a sectional view of the pipe clamp of FIG. 2 taken along line 5-5 of FIG. 4.
Figure 8:
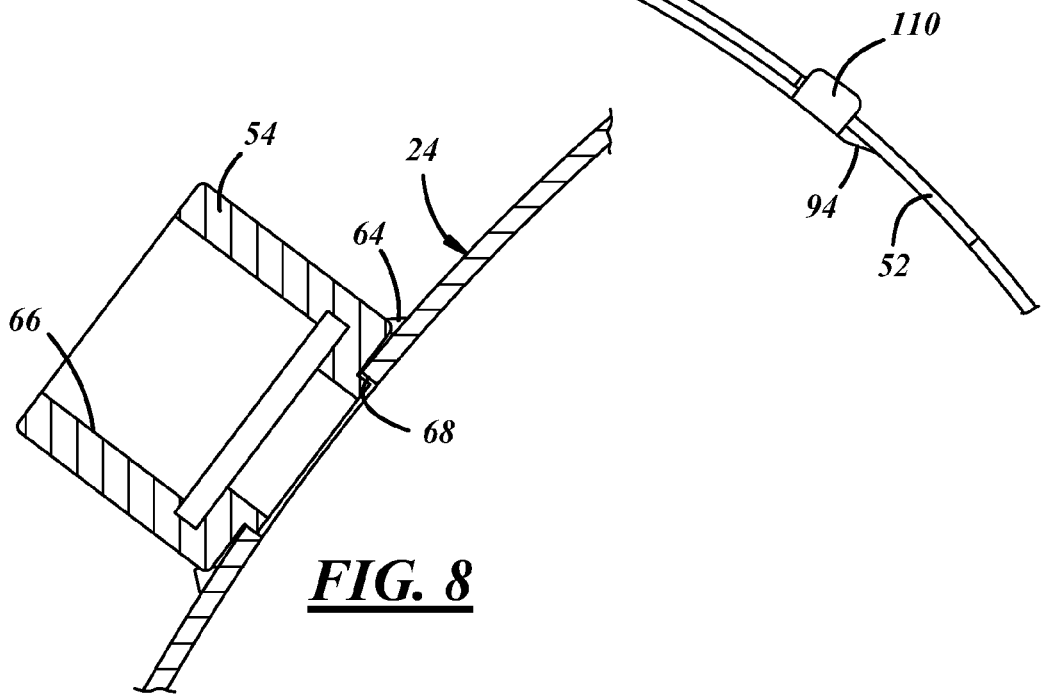
FIG. 8 is an enlarged view of an exemplary embodiment of a probe boss used with the pipe clamp of FIG. 2.

Referring to FIGS. 2 and 8, the probe boss 54 receives a temperature and/or pressure probe so that the temperature and/or pressure of the exhaust gasses passing though the first and second pipes 16, 20 can be taken. The probe boss 54 is mounted to the band 24 via a peripheral weld 64 at an interface between the probe boss and the band. The probe boss 54 is located at the first channel segment 48 so that the associated probe can be inserted through a gap 65 located between the first and second pipe ends 18, 22 (FIG. 5). The probe can be inserted through a passageway 66 located in the probe boss 54 and through a passageway 68 located in the band 24. In other embodiments, the probe boss 54 need not be provided.

The tightening mechanism 26 is connected to the band 24 and can be tightened and loosened to bring the first and second circumferential ends 32, 34 toward and away from each other. Referring to FIG. 3, in the illustrated embodiment the tightening mechanism 26 includes a double bolt-and-nut fastener combination, a reaction block 70, and a backing plate 72. The fastener combination includes a first and second T-bolt 74, 76, and a first and second nut 78, 80. Each bolt has a half-round head for evenly distributing tightening forces, and has a partly threaded shank. The reaction block 70 has a double convex shape and has a pair of passageways for receiving the first and second T-bolts 74, 76. The reaction block 70 has a radially-facing inward surface 82 (FIG. 5), which can be a flat plane or can be an arcuate surface. The backing plate 72 has a half-round shape and has a pair of passageways for receiving the first and second T-bolts 74, 76. When assembled, the first and second T-bolts 74, 76 are inserted through the respective passageways and through passageways located in the first and second flanges 44, 46. When tightened, the first and second nuts 78, 80 are screwed down on the first and second T-bolts 74, 76, and the half-round heads, reaction block 70, and backing plate 72 act together to pull the first and second circumferential ends 32, 34 toward each other to cause a radially inward force that is evenly distributed across the circumference of the band 24. In other embodiments, the tightening mechanism 26 can have different constructions and configurations. For example, the tightening mechanism 26 can have a single bolt-and-nut fastener combination, the reaction block 70 and backing plate 72 can have a notch provided in their radially-facing inward surfaces to accommodate a radially protruding rib, the reaction block and/or backing plate need not be provided, and the tightening mechanism can be of the quick-attach type as shown by one example in U.S. Pat. No. 7,441,311 to Lovgren et al., to name a few examples.

When assembled, the bridge 28 spans a break 84 (FIG. 3) in the otherwise circumferentially continuous band 24 and protects against exhaust gas leakage thereat. In cross-sectional profile, the bridge 28 generally matches that of the band 24 and in one sense the bridge 28 is a cut segment of the band 24. In some cases, the bridge 28 replaces a circumferentially continuous inner sealing sleeve or a circumferentially discontinuous split inner sealing sleeve provided in other pipe clamps, though need not. The bridge 28 can be made from steel such as grade 409 stainless steel, or from another suitable material. In different examples, the bridge 28 can have an axial width ranging between about 55-68 mm and can have a radial thickness of about 1.22 mm, about 0.74 mm, or about 0.38 mm; of course other dimensions are possible and can depend on the application. For example, the exact radial thickness of the bridge 28 can depend on, among other factors, the required or desired structural integrity of the band and the radial thickness of the gasket 30.

Figure 7:
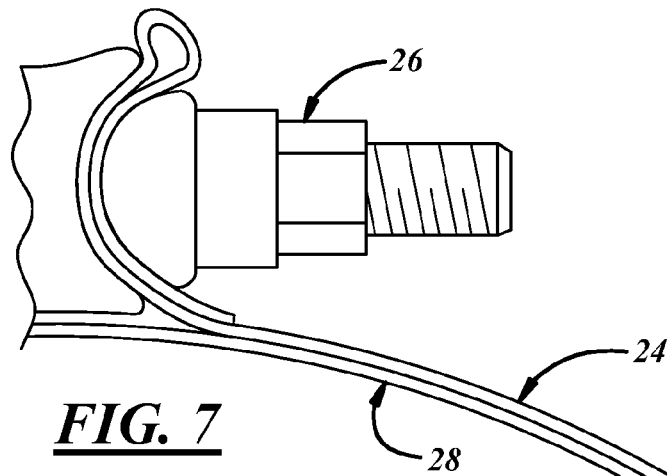
FIG. 7 is a side view of the pipe clamp of FIG. 2.

Referring to FIGS. 3 and 4, the bridge 28 spans the axial extent of the band 24 and has a first axial end 86 that is axially aligned with the first axial end 36 of the band, and has a second axial end 88 that is axially aligned with the second axial end 38 of the band. The bridge 28 has a circumferential length that is at least coextensive with the circumferential extent of the break 84 and can be more or less than shown. The bridge 28 extends circumferentially from a first circumferential end 90 to a second circumferential end 92. The first circumferential end 90 may have a first chamfer or bevel 94 (FIG. 7), and the second circumferential end 92 may have a second chamfer or bevel 96. The first and second bevels 94, 96 provide a mostly uninterrupted and smooth progression between the bridge 28 and the band 24 to accommodate the seated gasket 30, as compared to a nonbeveled end which would produce a vertical step thereat and in some cases could deform the gasket and thus be a source of fluid leak. In some cases, a minimal transitional structure (e.g., beveled edge) between the bridge 28 and the band 24 facilitates use of a thinner gasket than would otherwise be the case (e.g., vertical step). In one example, the first and second beveled surfaces create an angle of 1-10°, preferably 2°, with respect to an outer surface 100 of the bridge 28. The first and second bevels 94, 96 are located continuously along the edge of the respective first and second circumferential ends 90, 92. On a radially inwardly facing side the bridge 28 has an inner surface 98, and on a radially outwardly facing side the bridge has the outer surface 100.

Referring to FIGS. 3-5, in the illustrated embodiment the bridge 28 has a second channel segment 102, a first and second embossment 104, 106, and a first and second pilot feature 108, 110. The second channel segment 102 is similar in shape and size to the first channel segment 48 of the band 24. When assembled, the first and second channel segments 48, 102 together define a circumferentially continuous circular channel 112 that is located in the interior portion of the pipe clamp 10 or on the radially inwardly facing inner surface of the pipe clamp. The second channel segment 102 receives a section of the gasket 30 and is located about axially midway in the bridge 28 inwardly of the first and second axial ends 86, 88, and extends circumferentially between the first and second circumferential ends 90, 92. The axial extent of the second channel segment 102 can be substantially the same as that of the first channel segment 48, or can be slightly less than that of the first channel segment. The second channel segment 102 is located in the inner surface 98 and produces a radially protruding rib in the outer surface 100. In one example, the radial depth of the second channel segment 102 as measured from the immediately surrounding and unchanneled inner surface 98 is about 0.4 mm; the exact radial depth of the second channel segment can vary for different applications and can depend on, among other factors, the radial thickness of the gasket 30. The second channel segment 102 is bounded by slanted first and second transitional sections 114, 116 that lead to axially extending first and second side walls 118, 120.

The first and second embossments 104, 106 are respectively located in the first and second side walls 118, 120, and, when assembled, are located radially beneath the tightening mechanism 26. Each embossment 104, 106 can produce a radially protruding rectangular structure in the outer surface 100, or can produce a structure of another shape. Axially, each embossment 104, 106 spans a majority of the axial extent of the respective side wall 118, 120, and circumferentially, each embossment spans the circumferential extent of the reaction block 70. When assembled and in a loosened state (i.e., untightened), a first and second space 122, 124 are located between the first and second embossments 104, 106 and the first and second pipes 16, 20.

The first and second pilot features 108, 110 complement and interact with the first and second pilot features 50, 52 of the band 24. Referring to FIGS. 3, 4, and 6, in the illustrated embodiment the first and second pilot features 108, 110 are first and second fingers respectively extending radially outwardly from the first and second axial ends 86, 88. The first and second fingers are received in the first and second cutouts of the band 24. Like the first and second pilot features 50, 52 of the band 24, the first and second pilot features 108, 110 can have different designs and locations and can largely depend on the design and location of the band's pilot features, or vice-versa. For example, the pilot features could be located inwardly of the axial ends, the pilot features could be cutouts or openings, a single pilot feature or more than two pilot features could be provided, or a combination thereof. Furthermore, the pilot features need not be provided in the bridge.

In some embodiments, the bridge 28 can be pre-assembled to other components of the pipe clamp 10, though need not. For example, the bridge 28 can be attached to the band 24 by one or more spot-welds at a side of the bridge and band opposite the pilot features such as near the second circumferential end 92; in this case, the first circumferential end 90 and the first and second pilot features 108, 110 would be slidable in the circumferential direction relative to the first circumferential end 32 upon assembly and tightening for appropriate circumferential adjustment. Also, and referring to FIG. 4, the bridge 28 can be attached to the reaction block 70 by one or more spot-welds 125. These spot-welds 125 can be located away from the second channel segment 102 to avoid deformation of the channel segment and possible interference with the gasket 30 upon assembly. Further, the bridge 28 can be attached to the band 24 via a mechanical interlock such as by fold-over tabs that are wrapped around first and second axial ends 36, 38 of the band.

The gasket 30 is seated in the channel 112 and forms a gasket-to-metal seal at the first and second pipe ends 18, 22. The gasket 30 can be made of any suitable material for the intended application. For example, a relatively soft material that is compressed when the band clamp 10 is tightened; for automotive applications such materials can include a graphite-based material, a mica-based material, a ceramic fiber, and a fiberglass. In some cases, and depending on the material used for the gasket 30, a stainless steel foil can be located on an inner surface 126 to protect the gasket against direct contact with exhaust gas which could cause oxidation. Referring to FIGS. 3 and 5, the gasket 30 has an outer surface 128, and has an axial width approximately equal to that of the channel 112. The gasket 30 can have a radial thickness approximately equal to or greater than the radial depth of the channel 112. In the case of a greater radial thickness than the radial depth, the gasket can radially compress upon rundown of the tightening mechanism 26 to permit a metal-to-metal engagement between the side walls 60, 62 and the outer surfaces of the pipes 16, 20. In some cases, a radially thinner gasket 30 can facilitate such metal-to-metal engagement. Example radial thicknesses of the gasket 30 include 0.5 mm, 0.76 mm, and 1.5 mm; of course other thicknesses are possible. A pressure sensitive adhesive can be located on the outer surface 128 to preassemble the gasket 30 to the band 24 and/or to the bridge 28, or a stainless steel structure can be embedded in the gasket in order to impart a resilient-radially-outwardly-springing force which preassembles the gasket to the band via a press-fit. And though not shown, a passageway can be located in the gasket 30 to receive the temperature and/or pressure probe. In other embodiments the gasket 30 can have different constructions. For example, the gasket 30 need not be circumferentially continuous as shown and instead could be circumferentially discontinuous like an open loop with mating circumferential ends, or the gasket could have an axial width greater or less than that of the channel 112.

In use, the bridge 28 is positioned inside of the band 24 and radially beneath the tightening mechanism 26. The outer surface 100 of the bridge 28 abuts against the inner surface 40 of the band 24, and the outer surface of the radially protruding rib formed by the second channel segment 102 and the outer surfaces of the first and second embossments 104, 106 abut against the inward surface 82 of the reaction block 70. The gasket 30 can be seated in the channel 112 before the pipe clamp 10 is placed around the pipe ends 18, 22. Then the gasket 30 remains seated in the channel 112 by an outward springing force exerted by the gasket against the channel because of its intrinsic resiliency, or can be more positively held in the channel via an adhesive, detent, or another mechanical interconnection.

Upon tightening, the reaction block 70 exerts a radial inward force against the radially protruding rib of the second channel segment 102 and the first and second embossments 104, 106, which in turn exert a radial inward force against the gasket 30 and the first and second pipe ends 18, 22. Thus, together the radially protruding rib and the first and second embossments 104, 106 distribute the exerted radial inward force across the axial width of the bridge 28 and to the underlying gasket 30 and pipe ends 18, 22, as opposed to overly distributing the exerted radial force to the radially protruding rib in the bridge which could itself deform and overcompress the gasket. The first and second embossments 104, 106 impart rigidity and strengthen the bridge 28 at a location beneath the reaction block 70 which prevents over-compression of the gasket 30 thereat and the resulting leak that may otherwise occur. Also, the distributed radial force prevents deformation to the reaction block 70 as may otherwise occur against the radially protruding rib and without the first and second embossments 104, 106. In the illustrated embodiment, the circumferential extent of the cutouts of the band allow the band to circumferentially contract upon tightening while avoiding interference which might otherwise occur from the first and second fingers of the bridge 28.

Referring to FIGS. 9-13, an illustrated embodiment of a bridge and gasket assembly includes a bridge 228, a first gasket 230, and a second gasket 231. The bridge and gasket assembly can be a part of the pipe clamp 10 with the band and tightening mechanism described with reference to FIGS. 1-8.

The bridge 228 is similar in some ways to the bridge 28 of FIGS. 1-8, and some of those similarities will not be described here. When assembled, the bridge 228 spans a break 284 in the otherwise continuous band 224 and protects against exhaust gas leakage thereat. In the illustrated embodiment, the bridge 228 has a generally rectangular shape and spans the axial extent of the band 224, and has a first axial end 286 and a second axial end 288. The bridge 228 also has a first circumferential end 290 and a second circumferential end 292; the first and second circumferential ends do not, though can, have a chamfered or beveled edge. On a radially inwardly facing side the bridge 228 has an inner surface 298, and on a radially outwardly facing side the bridge has an outer surface 300. The inner surface 298 is a generally flush surface and does not, though can, have a channel segment located therein.

Figure 10:
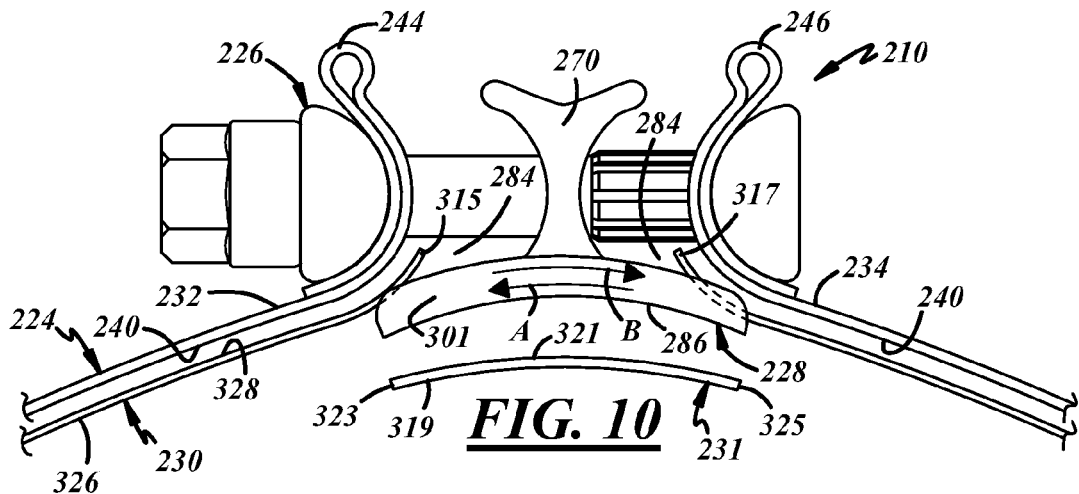
FIG. 10 is a partially exploded view of the bridge and gasket assembly of FIG. 9.

In side profile and in an untightened state, such as shown in FIG. 10, the bridge 228 has a more pronounced and sharper bend than the band 224; in other words, the bridge has a smaller bend radius than that of the band. This structural relationship produces a radial gap between respective first and second circumferential ends of the bridge 228 and the band 224 when the bridge is attached to the tightening mechanism 226. During tightening of the pipe clamp 210, interference is avoided between respective first and second circumferential ends of the bridge 228 and the band 224, as can occur in some cases with no radial gap. The radial gap also delays contact and engagement between the bridge 228 and the band 224, between the bridge and the first gasket 230, and between the first gasket and the second gasket 231 until later stages of the tightening action when the first and second circumferential ends 232, 234 of the band are pulled close together. This can help avoid mispositions of the bridge 228 with respect to the band 224, and can help avoid mispositions of the first and second gaskets 230, 231 with respect to each other such as pooling or wedging of gasket material, especially pooling of material of the first gasket at the first and second circumferential ends 290, 292 of the bridge.

Figure 9:
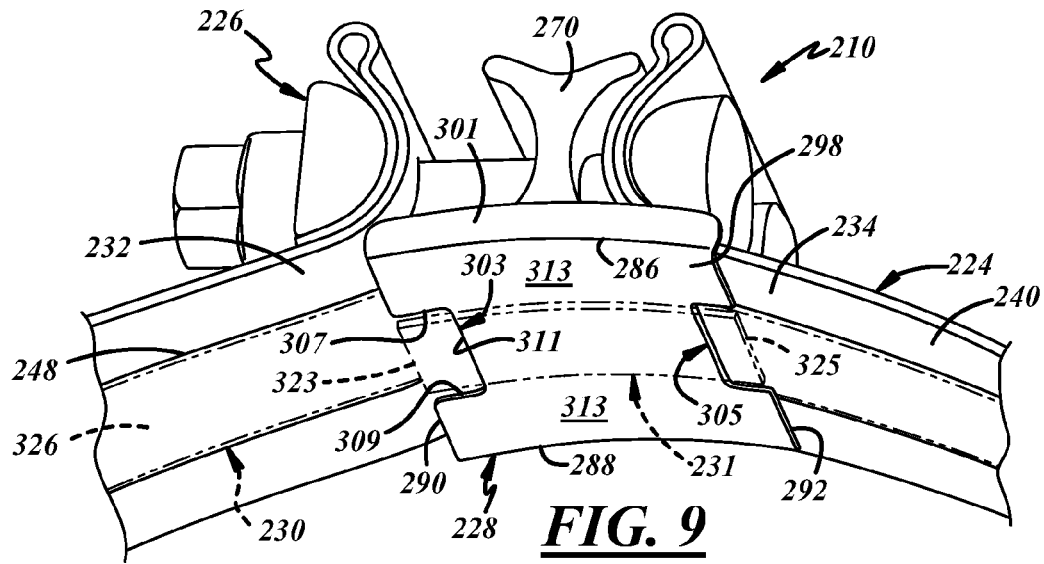
FIG. 9 is an enlarged view of an exemplary embodiment of a bridge and gasket assembly shown in a loosened state.
Figure 11:
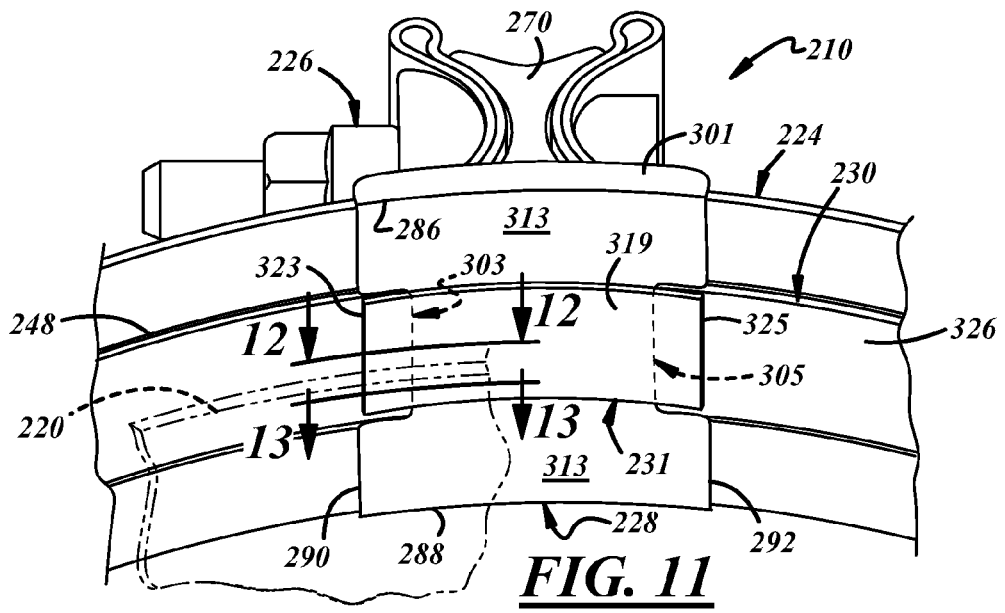
FIG. 11 is an enlarged view of the bridge and gasket assembly of FIG. 9 shown in a tightened state.

Referring to FIGS. 9-11, in the illustrated embodiment the bridge 228 has a first flange 301, a second flange (not shown), a first cutout 303, and a second cutout 305. The first and second flanges 301 help locate the bridge 228 on the band 224 and help strengthen the structure of the bridge 228 to help prevent buckling and other deformation that could occur during assembly, tightening, and use. The first and second flanges 301 are respectively located in axial ends 286, 288 and are folded-up sides angled perpendicular to the outer surface 300. The first and second flanges 301 need not be provided for certain applications, such as where no structure-strengthening features are needed or where different structure-strengthening features are provided like circumferentially directed ribs.

The first and second cutouts 303, 305 facilitate the transition between the first and second gaskets 230, 231 at the engagement and confrontation of the gaskets. The cutouts 303, 305 limit direct engagement between the bridge 228 and the first gasket 230 during the tightening action, and can help avoid mispositions such as pooling or wedging of gasket material, especially pooling of material of the first gasket at the first and second circumferential ends 290, 292 of the bridge. The first and second cutouts 303, 305 are respectively located in the circumferential ends 290, 292 and are generally U-shaped voids in the ends; of course, other void shapes are possible such as half-circle shapes. The first and second cutouts 303, 305 have an axial extent that can be equal to or greater than the axial extent of the second gasket 231, and have a circumferential extent sufficient to span the break 284 in the band 224 when the band is tightened. Each cutout has a first side edge 307, a second side edge 309, and a bottom edge 311. The cutouts 303, 305 need not necessarily be provided in the bridge 228.

In assembly, the bridge 228 is attached to the reaction block 270 so that the bridge stays with the reaction block during the tightening action in order to properly locate the position of the bridge with respect to the band 224; for example, for proper circumferential position with respect to the circumferential ends 232, 234 of the band. The bridge 228 can be pre-assembled and attached to the reaction block 270 before the pipe clamp 210 is placed around the pipe ends. Referring to FIG. 10, during tightening the bridge 228 moves with the reaction block 270 as the first and second flanges 244, 246 of the band 224 move toward each other, as one of the first and second flange moves toward the other, and/or as the reaction block itself moves toward one of the first and second flanges of the band (reaction block movement represented by arrows A, B). This too can help avoid mispositions such as pooling or wedging of gasket material, especially pooling of material of the first gasket 230 at the first and second circumferential ends 290, 292 and/or at the bottom edge 311 of the bridge 228. Referring to FIGS. 9 and 11, the bridge 228 can be attached to the reaction block 270 via spot-welds 313 which bring the outer surface 300 in direct contact with the radially-facing inward surface of the reaction block. The bridge 228 can also be attached in other ways such as by fold-over tabs extending from the bridge and pinching both sides of the reaction block 270 or engaging a retaining structure.

Figure 12:
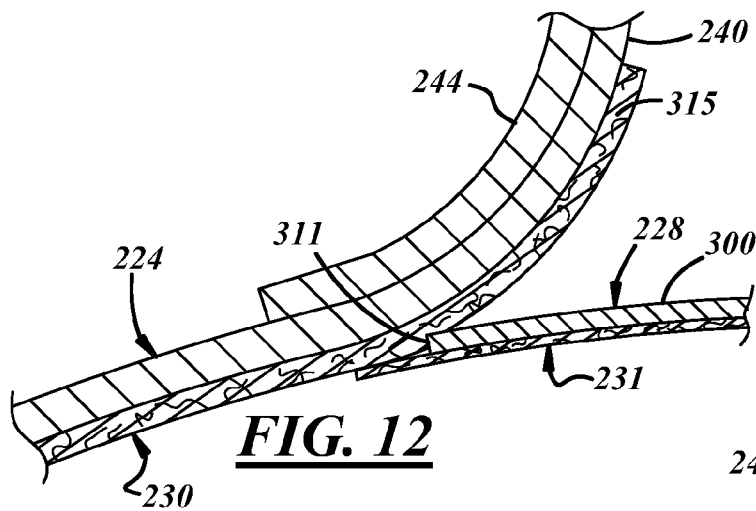
FIG. 12 is a sectional view taken along line 12-12 in FIG. 11.

The first gasket 230 is seated in the first channel segment 248 of the band 224 and forms a gasket-to-metal seal against the first and second pipe ends. The first gasket 230 can be made of any suitable material such as described above in connection with the gasket 30. In this regard, the first gasket 230 is similar in some ways to the gasket 30 of FIGS. 1-8, and some of those similarities will not be described here. Referring to FIGS. 9-11, the first gasket 230 has an inner surface 326 and an outer surface 328. A stainless steel foil can be located on the inner surface 326 as previously described for the embodiment of FIGS. 1-8, and a pressure sensitive adhesive, an embedded stainless steel structure or some other adhering feature can be used and/or located on the outer surface 328 in order to preassemble and attach the first gasket 230 to the band 224. The first gasket 230 has a split and open loop structure, and has first and second circumferential ends 315, 317. Referring to FIGS. 10 and 12, when assembled the first gasket 230 follows the inner surface 240 of the band 224, and the first and second circumferential ends 315, 317 wrap at least part way with the first and second flanges 244, 246 of the band. The first and second circumferential ends 315, 317 confront the inner surface 240 at the first and second flanges 244, 246, and can maintain direct contact with the inner surface at the flanges (FIG. 12) or can oppose the inner surface at the flanges through a gap (not shown).

The second gasket 231 is located against the inner surface 298 of the bridge 228 and forms a gasket-to-metal seal against the first and second pipe ends (though shown in phantom in FIG. 9, which sometimes indicates that a part is hidden behind or beneath another part). The second gasket 231 is similar in some ways to the gasket 30 of FIGS. 1-8, and some of those similarities such as the material will not be described here. Referring to FIGS. 9-11, the second gasket 231 has an inner surface 319 and an outer surface 321. A stainless steel foil can be located on the inner surface 319 as previously described for the embodiment of FIGS. 1-8, and a pressure sensitive adhesive, or some other adhering feature can be used and/or located on the outer surface 321 in order to preassemble and attach the second gasket 231 to the bridge 228. The second gasket 231 has an arcuate structure, and has first and second circumferential ends 323, 325. Referring to FIGS. 9 and 11, the circumferential ends of the second gasket 231 at least partially overlap the cutouts 303, 305 and extend in the circumferential direction beyond the bottom edges 311 of the cutouts.

The bridge and gasket assembly of FIGS. 9-13 is designed to provide a mostly uninterrupted and smooth transition and progression between the first and second gaskets 230, 231, and between the bridge 228 and the first gasket. In other words, the assembly is designed to minimize or altogether eliminate a vertical step or other nonflush surface shape, which in some cases could deform the second gasket 231 and/or cause an uneven surface-to-surface contact between the pipe clamp 210 and the pipe, and consequently be a source of exhaust gas leak. One way to facilitate a mostly uninterrupted transition is to maintain certain radial-thickness-relationships among the bridge 228, the first gasket 230, and the second gasket 231. For example, the first gasket 230 can have a radial thickness value that is greater than the radial thickness of the bridge 228, and greater than the radial thickness of the second gasket 231. Also, the radial thickness of the first gasket 230 can be greater than or equal to the sum of the radial thicknesses of the bridge 228 and the second gasket 231. In one example, the radial thickness of the bridge 228 is about 0.38 mm, the radial thickness of the first gasket 230 is about 1.0 mm, and the radial thickness of the second gasket 231 is about 0.45 mm. Of course, the bridge 228 and the first and second gaskets 230, 231 need not satisfy these relationships, and can have different radial thickness values for each of the bridge and the first and second gaskets; for example, the first gasket and/or the second gasket can have a radial thickness of about 0.6 mm.

Figure 13:
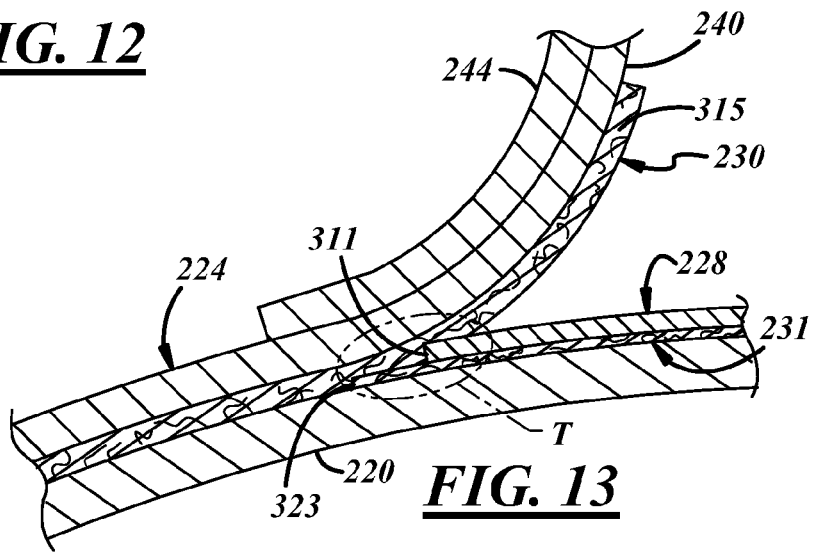
FIG. 13 is a sectional view taken along line 13-13 in FIG. 11, showing the bridge and gasket assembly interacting with a pipe end.

Referring to FIGS. 12 and 13, when the pipe clamp 210 is in a tightened state, the first and second gaskets 230, 231 become compressed together against the outer surface of the pipes (second pipe 220 shown), and the bridge 228 becomes buried into the material of the first gasket. This is partly facilitated by satisfying at least some of the above-described radial-thickness-relationships, though can exist in some cases without satisfying the relationships. Referring to FIG. 13, the first circumferential end 323 of the second gasket 231 and the confronting portion of the first gasket 230 are compressed together, and the bottom edge portion 311 of the bridge 228 is embedded into the confronting portion of the first gasket to create a substantially uninterrupted transition section T thereat and a substantially flush interface therebetween. This occurs at the other end of the gaskets and bridge as well, though not shown.

Figure 14:
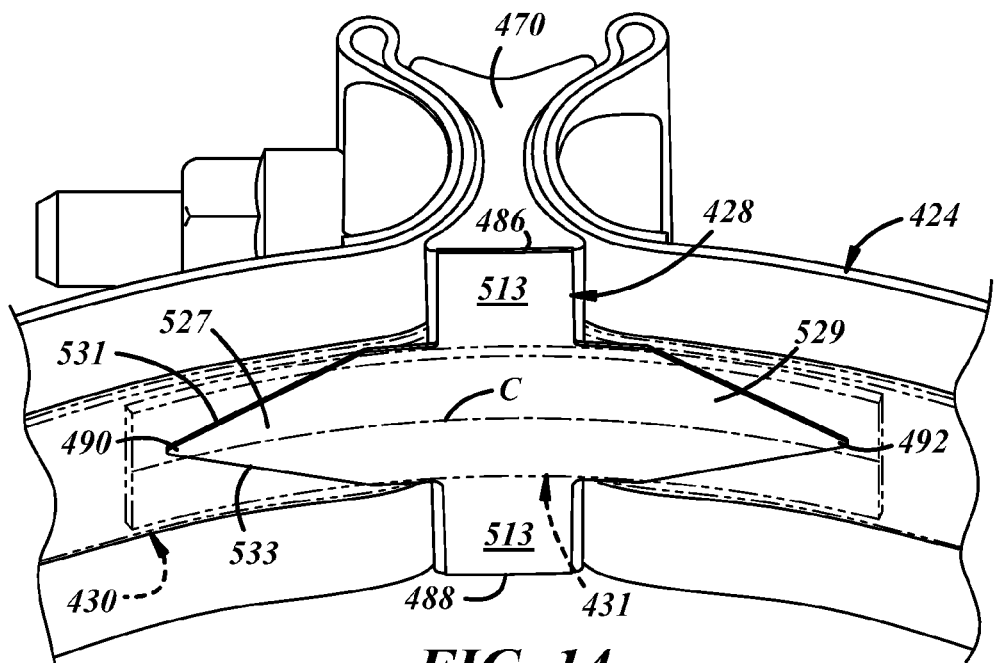
FIG. 14 is an enlarged view of an exemplary embodiment of a bridge and gasket assembly shown in a tightened state.

Referring to FIG. 14, another illustrated embodiment of a bridge and gasket assembly is shown that is similar in some ways to the bridge and gasket assembly of FIGS. 9-13, and some of those similarities will not be described here; for example, a first gasket 430 is similar to the first gasket 230, and a second gasket 431 is similar to the second gasket 231.

A bridge 428 spans a break in the otherwise continuous band 424 and protects against exhaust gas leakage thereat. The bridge 428 has a first axial end 486 and a second axial end 488, and has a first circumferential end 490 and a second circumferential end 492. Like the bridge 228, the bridge 428 has a more pronounced and sharper bend than the band 424.

In the illustrated embodiment, the bridge 428 includes first and second triangular-shaped arms 527, 529 extending in opposite circumferential directions with respect to each other. A first and second axial side 531, 533 at each of the arms 527, 529 converge toward each other and toward an axial centerline C of the second gasket 431. The sides 531, 533 can meet at a point as shown, but need not and can create a more rounded or blunted circumferential end. In use, potential exhaust gas leakage is drawn and migrates along the sides 531, 533 toward the axial centerline C and is consequently kept from escaping the joint.

Like the bridge 228, the bridge 428 is attached to the reaction block 470 via, for example, spot-welds 513. The second gasket 431 is shown in phantom and is located on the inner surface of the bridge 428. The second gasket 431 has circumferential ends that extend in the circumferential direction behind the first and second arms 527, 529. And the bridge 428 can possess the radial-thickness-relationships described-above for the bridge 228, and in a tightened state the gaskets 430, 431 are compressed and the bridge 428 is buried into the material of the first gasket.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A pipe clamp, comprising:
   a band extending circumferentially from a first circumferential end to a second circumferential end, and extending axially from a first axial end to a second axial end, said band having an inner surface defining a first channel segment located inwardly of said first and second axial ends and extending at least part way between said first and second circumferential ends;
   a tightening mechanism connected to said band and including at least one fastener to bring said first and second circumferential ends toward each other to tighten said band, said tightening mechanism having a reaction block with a radially-facing inward surface, where the reaction block is positioned between the first and second circumferential ends;
   a bridge abutting said inner surface and circumferentially spanning a break in said first channel segment at said tightening mechanism, said bridge having a second channel segment extending circumferentially between a first circumferential end and a second circumferential end of said bridge, said second channel segment being aligned with said first channel segment such that said first and second channel segments together define a substantially continuous circular channel located at an interior portion of the pipe clamp, wherein said first channel segment extends along a majority of the circumferential extent of said substantially continuous circular channel, and the extent of said second channel segment between said first and second circumferential ends of said bridge extends along the remaining circumferential extent of said substantially continuous circular channel, said bridge having a first side wall extending from a side of said second channel segment to a first axial end of said bridge, said bridge having a second side wall extending from an opposite side of said second channel segment to a second axial end of said bridge, said bridge having a first embossment in said first side wall and located radially beneath said tightening mechanism, said bridge having a second embossment in said second side wall and located radially beneath said tightening mechanism, said first and second embossments protrude radially outwardly such that, during tightening of the pipe clamp via said tightening mechanism, said radially inward surface of said reaction block engages said first and second embossments and engages an outer surface of said bridge at said second channel segment to exert a radially-inward force on said first and second embossments and on said second channel segment; and
   a gasket seated at least partially within said substantially continuous circular channel; wherein said first circumferential end has a first bevel located thereon and said second circumferential end has a second bevel located thereon, said first and second bevels providing a substantially uninterrupted inner surface of said substantially continuous circular channel against which said gasket is seated, wherein said first axial end of said bridge is axially aligned with said first axial end of said band, and said second axial end of said bridge is axially aligned with said second axial end of said band, and wherein said band has a first pilot feature located thereon, and said bridge has a second pilot feature that interacts with the first pilot feature to guide positioning of said bridge against said inner surface of said band.

2. The pipe clamp of claim 1, wherein each of said first and second bevels create an angle ranging from 1° to 10° with respect to an outer surface of said bridge.

3. The pipe clamp of claim 1, wherein said first pilot feature is a cutout located in said first axial end of said band, and said second pilot feature is a finger extending radially from said first axial end of said bridge, said finger being received in said cutout to thereby permit relative circumferential movement of a first circumferential end of said bridge relative to said first circumferential end of said band while maintaining axial alignment of said bridge and said band.

4. The pipe clamp of claim 1, wherein said gasket is pre-assembled within said channel before the pipe clamp is used to join pipe ends.

5. The pipe clamp of claim 1, wherein said bridge is attached to said reaction block via one or more welds directly attaching an outer surface of said bridge to said radially-facing inward surface of said reaction block.

* * * * *